United States Patent [19]
Zimmermann et al.

[11] Patent Number: 4,542,403
[45] Date of Patent: Sep. 17, 1985

[54] METHOD OF CONFINING THE SIGNAL LEVEL RANGE OF A TELEVISION CAMERA

[76] Inventors: Friedrich Zimmermann, An der Fuchsenh tte 31, 6101 Rossdorf; Herbert Zettl, Wolfskehlstr. 28, 6081 Erfelden; Hans W. Zappen, Reidstrasse 18, 6140 Bensheim; Christian Sacher, In den Rödern 4, 6100 Darmstadt, all of Fed. Rep. of Germany

[21] Appl. No.: 481,862

[22] Filed: Apr. 4, 1983

[30] Foreign Application Priority Data

Apr. 5, 1982 [DE] Fed. Rep. of Germany ....... 3212616

[51] Int. Cl.[4] .............................................. H04N 9/535
[52] U.S. Cl. ...................................... 358/41; 358/225; 358/228
[58] Field of Search ................... 358/41, 55, 224, 228, 358/174

[56] References Cited

U.S. PATENT DOCUMENTS 4,312,014 1/1982 Ryan .................................... 358/41
4,368,484 1/1983 Stemme ............................... 358/41

Primary Examiner—Michael A. Masinick

[57] ABSTRACT

Before the camera is used to transmit a scene, a key or button (21) is actuated which causes a measurement field generator (23) to define a small portion of the picture field, where the video signal level of the greatest of the three color components will be compared with a reference level in an aperture control circuit (6) for setting the camera lens aperture. If this should result in a lens aperture above an upper limit or below a lower limit, an amplification step control (26) for an amplifier (8) is shifted one step so as to bring the lens aperture between the aforesaid limits. The comparison of the video signal level with the reference level is repeated until the amplification is sufficient to bring the lens aperture into the desired range. The measurement field is shown in the camera finder (14) and likewise any off-limits setting of the lens aperture and whether the manual control (28) is on a setting that permits the automatic amplification control to operate.

5 Claims, 1 Drawing Figure

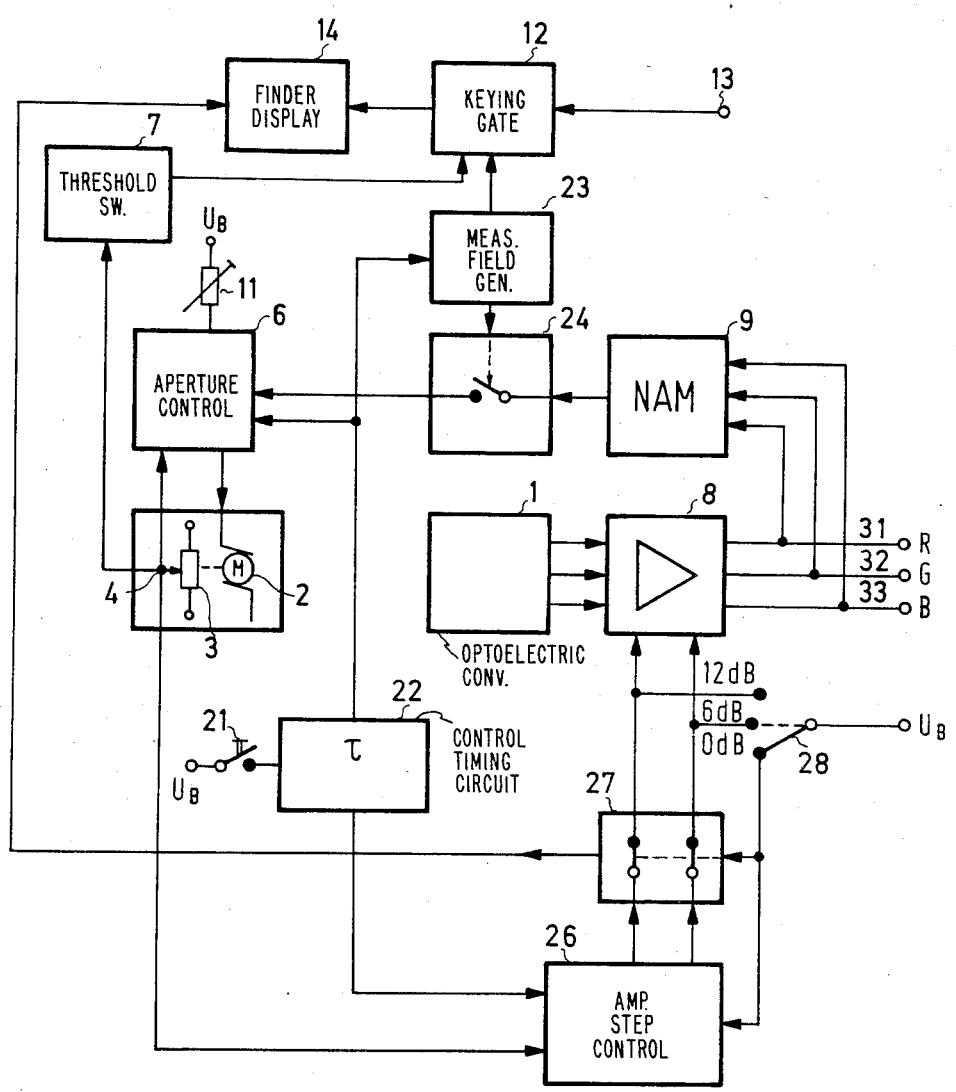

METHOD OF CONFINING THE SIGNAL LEVEL RANGE OF A TELEVISION CAMERA

The invention concerns a method of keeping within a suitable range the signal level of a color television camera having an electronic finder, an automatic aperture control and an output amplifier switchable in steps of various degrees of amplification, and in particular to a method of controlling the signal level in accordance with the brightness of the scene being picked up by the camera.

In the color television cameras heretofore known, it was usual, in order to deal with scenes of varying brightness, to adjust the aperture of the objective in such a way that the level of the video signal provided as an output by the pickup tube would remain practically constant. Then, in order to be able to operate a camera also at low illumination without any further possibility of increasing the aperture, it is known to provide a supplementary stepwise amplification increase. This last is normally manually set.

The setting of the amplification is difficult under certain conditions, because there is no reporting back of the aperture position which could give the operator information regarding the necessity of changing the amplification.

A television camera with automatic amplification adjustment is known from DE-OS No. 31 01 806 in which the stepwise switching of amplification takes place automatically in accordance with the scene brightness during the normal transmitting operation of the camera, in such a way that a mid-range aperture value is always maintained. That has the disadvantage that with chaning scene brightness, particularly in the case of outdoor pickup, it is necessary for maintenance of a mid-range aperture value to change the amplification at once. Sudden brightness changes are produced in the transmitted video signal which have a disturbing effect.

THE INVENTION

It is an object of the present invention to provide a method for limiting the signal level range of a television camera in which the camera is brought into control with respect to the ambient brightness before transmitting, so that during operation sudden changes in brightness cannot appear in the video signal.

Briefly, the video signal derived from the optoelectric converter of the camera is measured in a portion of the field of view and compared with a reference brightness value to control the aperture so as to bring the video signal level towards the reference value. Then, when the aperture goes above or below prescribed aperture pre-limits, which are somewhat inside the available extreme values of aperture, supplementary amplification is automatically added or reduced stepwise in order to reach ultimately the prescribed video level. The amount of amplification provided is indicated in the television camera finder.

The method of the invention has the advantage that the switching in or out of amplification automatically takes place only during a short measuring period, so that no disturbances in the transmitted video signal can show up, while the cameraman is informed at all times whether and with what amplification the amplifier is interposed, this being indicated in the finder.

Preferably a manual selector switch is made available on the camera which will permit the automatic provision of amplification at one or another level only when the manual switch on the camera is on its null position (the position for 0 db supplementary amplification).

THE DRAWING

The invention is further described by way of illustrative example with reference to the annexed drawing, in which the single FIGURE shows a circuit block diagram of an apparatus with which the method of the invention can be performed.

DESCRIPTION OF THE ILLUSTRATED EMBODIMENT

The light coming from a scene and projected upon the optoelectric converter 1 of the camera by means of a lens system (not shown) is controlled by the controllable aperture, typically of an iris diaphragm (not shown), located in the lens system. A motor 2 is provided for driving the leaves of the iris diaphragm to set the aperture. The motor 2 also drives the potentiometer 3. Since the aperture setting depends upon the potentiometer position, the latter can be used for feedback and indication.

The connection 4 of the potentiometer slider is accordingly connected on one hand to an aperture control circuit 6 and on the other hand to a threshold switch 7. In the aperture control circuit 6, the video signal taken from the optoelectronic converter 1, through an adjustable amplifier 8 and a non-additive mixer circuit 9, is compared with a prescribed signal level value set by the adjustable resistance 11, and from this comparison an activation signal is produced for the positioning motor 2 by which the diaphragm aperture is set.

In the threshold circuit 7 a signal is produced only when the potentiometer slider provides a voltage that is either above an upper aperture setting voltage value or below a lower aperture setting value. This signal is then supplied to a keying stage 12 which at its connection 13 receives a video signal for the finder 14 so that the signal value that may be produced corresponding to the aperture setting at the time will be keyed into the finder signal and reproduced on the picture screen of the finder 14. Thus, it will be shown in the finder 14 to the camera man whether the aperture is almost fully open (e.g., f number below 2.8) meaning that there is too little light, or almost fully closed (e.g., f number above 16) meaning that too much light is present. The relative aperture value is the reciprocal of the f number (i.e., 1:2.8 and 1:16 respectively).

The method of the invention for controlling the signal level range of a color television camera in accordance with scene brightness is carried out before actual transmission operation by pressing on a button 21 provided at the location of the objective of the camera. Pressing that button applies the operating voltage $U_B$ to activate a timing circuit 22, which at once provides a control signal to a measuring field generator 23 and to the aperture control circuit 6. The measuring field generator 23 produces a window signal which is supplied on one hand to the keying stage 12 for insertion into the finder video signal and, on the other hand, is supplied to a switch 24. In the middle region of the finder picture screen, a frame is reproduced (e.g., having a surface of about 1% of the picture screen surface). At the same time as the display of the frame, the switch 24 is closed, so that only during this time the largest of the signals supplied by the non-adding mixer (NAM) circuit 9 is passed on to the aperture control circuit 6. After comparison of this actual video signal with the prescribed video signal level, the aperture is set to a value that reduces this comparison result to near zero.

If this aperture f number should now understep a certain prescribed value (e.g., 2.8), the signal available at the connection 4 of the potentiometer 3 is evaluated in another circuit, namely in an amplification control state 26. This stage 26 is activated by the timing control circuit 22 only after the lapse of an interval sufficient for setting the aperture. The switchable amplifier 8 is then switched over to its next higher amplification setting, e.g. 6 dB. Thereafter, another aperture setting for adjusting the aperture under the conditions of the higher amplification is carried out. When the aperture setting oversteps the lower pre-limit f number value (2.8 in this example), the process of bringing the signal level within the desired range is completed. If the lower pre-limit value of aperture setting is not yet overstepped, the amplification control stage operates the switching stage 27 to provide the next higher amount of amplification, e.g., 12 dB, and the aperture is adjusted in a manner corresponding to this amount of amplification.

The method runs in the opposite direction if the aperture value oversteps an upper pre-limit of aperture f number, for example 5.6.

In the illustrated case, the described operation of the automatic amplification control assumes that the manually operable so-called dB-switch 28 has been set, as shown in the drawing, at the amplification step "0 dB" of the step switch. This step switch 28 disposed right on the camera makes it possible for the camera man to put the automatic system out of operation in case of emergency or special conditions, and can then himself or herself choose a desired degree of amplification (for example, the position of the switch 28 shown in broken lines in the drawings).

After the running of the method of the present invention for putting the signal level of the camera within the proper signal level range, the color television signal components R,G and B are available at the output terminals 31,32 and 33, respectively, during the following normal operation of the camera.

The non-addition mixing stage 9 is of a kind described in U.S. Pat. No. 3,371,160.

The measuring field generator 23 is of a type described in the "Functional Block Diagrams" of our TV camera KCA 100 (control monitoring 2-10587-04-BT and 1-10587-04-FP).

The circuit of the timing control 22 is of a kind described in Motorola C-MOS DATA Book, 1979, MC 14538 (Monostable multivibrator).

We claim:

1. Method of signal level setting of a color television camera having an electronic finder, in accordance with scene brightness, by use of a camera equipped with an opto-electronic converter for delivering a video signal, an automatic camera aperture control, a video amplifier of switchable degree of amplification and amplifier control switching means, comprising the steps of:

measuring, in a selected measurement portion of the picture field, the video signal derived from the scene by the opto-electronic converter of the camera;

comparing the measured video signal with a reference value and operating the camera aperture control so as to bring the measured video signal towards said reference value;

comparing the camera aperture setting produced by the camera aperture control with predetermined upper and lower pre-limit values, selected to be somewhat inside the available extreme values of aperture, and operating said amplifier control switching means in response to overstepping of said upper pre-limit or understepping said lower pre-limit value so as to make a corrective change step, in the degree of amplification of said derived video signal;

repeating the above steps if and to the extent necessary to bring the camera aperture setting within the range limited by said pre-limit values, and indicating in the camera finder the nominal amount of amplification, if any, provided in the video channel by said amplifier.

2. Method according to claim 1, in which the camera and its opto-electronic converter deliver a composite color video signal having three color video component signals, in which method the video signal measuring step is performed by selecting the greater of the three video color component signals of the composite color video signal in said selected portion of the camera field by non-additive mixing of said color component signals, and in which method a signl value that may be produced corresponding to the aperture setting at the time in said selected portion of the camera field is indicated in the finder screen by contemporaneous keying of a threshold comparison result into the signal supplied to the finder in a manner indicating the location of said selected field portion.

3. Method according to claim 1, in which the starting of the first measuring step is produced by actuation of a finger-operated switch disposed on the objective of the color television camera and in which, in response to the beginning of a measuring step, a timing operation is performed by which the function of operating the amplifier control switching means is delayed for an interval long enough for the operation of the camera aperture control to be completed.

4. Method according to claim 1, in which each of said pre-limit values of aperture is displayed on the screen of the finder only so long as the aperture setting is not at a value beyond the particular pre-limit value.

5. Method according to claim 1, in which the operation of the amplifier control switching means is enabled only if a preliminary step has been performed of setting a second amplifier switching control means, which is manually operable, at its "0 db" setting.

* * * * *